Patented Feb. 6, 1940

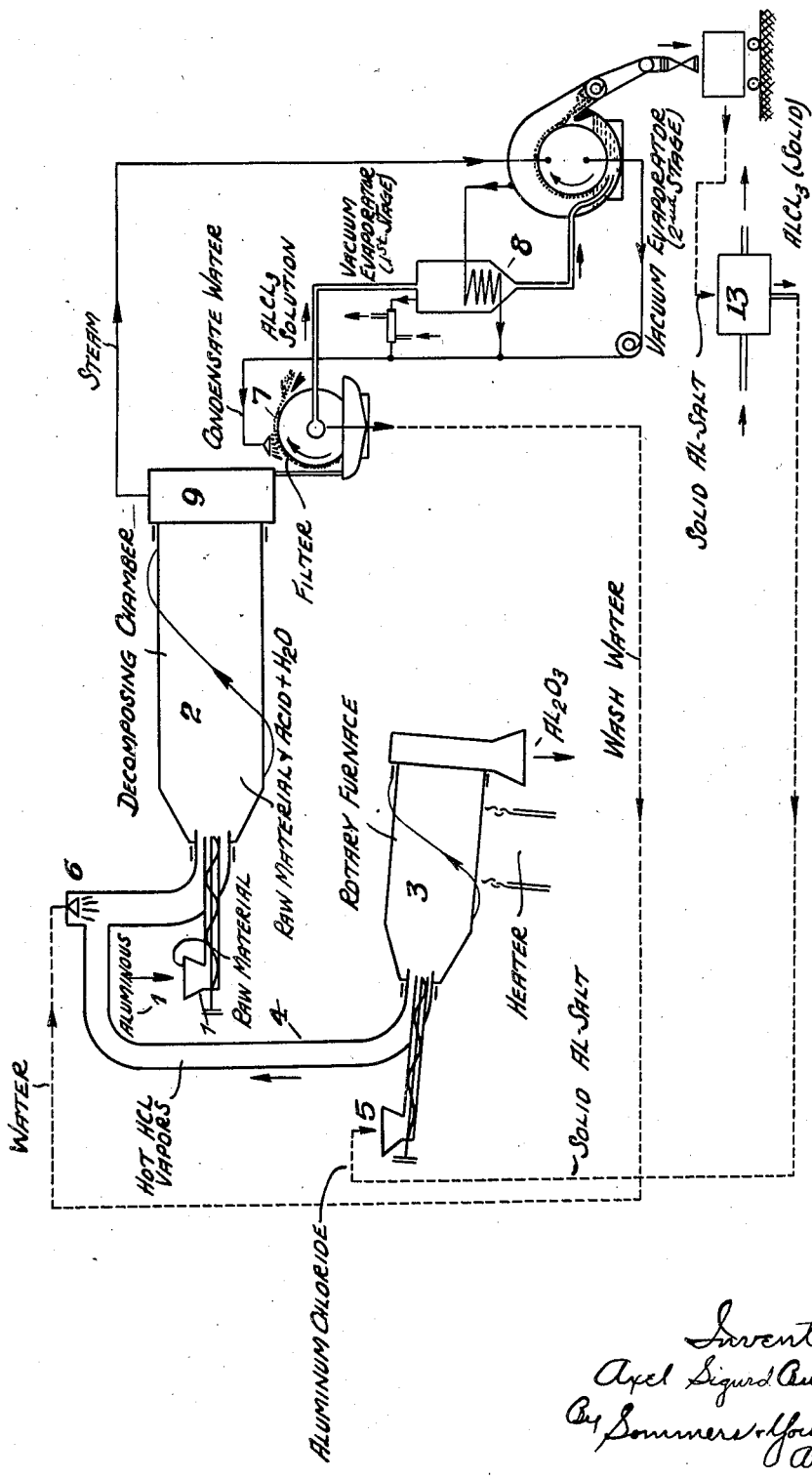

2,189,376

UNITED STATES PATENT OFFICE 2,189,376

METHOD OF PRODUCING ALUMINIUM OXIDE FROM ALUMINIFEROUS RAW MATERIALS

Axel Sigurd Burman, Huddinge, Sweden

Application July 23, 1936, Serial No. 92,230
In Sweden July 29, 1935

5 Claims. (Cl. 23—143)

In producing pure aluminium oxide by decomposing an aluminiferous raw material by means of an acid the common method has hitherto been to produce a pure aluminium compound from the acid solution by precipitation or crystallization, which compound was converted into $Al_2O_3$ by thermal dissociation.

The present invention relates to an improved method of said kind according to which the entire acid solution after removal of the insoluble residues is first evaporated to dryness by utilizing the reaction heat evolved in decomposing the raw material by the acid used as well as the heat contained in the acid vapours resulting from the thermal dissociation whereupon the resulting dry aluminium compound is decomposed by thermal dissociation to form aluminium oxide.

Another object of the invention is to utilize the wash water obtained in washing the insoluble residues of the aluminiferous raw material in a more favorable manner than hitherto.

A further object of the invention is to perform the decomposition of the aluminiferous raw material by means of the hot acid vapours evolved in the thermal decomposition of the aluminium compound produced from the raw material in order to reduce the consumption of acid to a minimum.

The reaction taking place in reacting upon the aluminiferous raw material, such as clay, bauxite, leucite, etc., by means of a mineral acid is exothermic, causing the formation of considerable quantities of steam dependent on the temperature of the reacting substances and the concentration of the acid used. I utilize said steam together with vapours obtained in other stages of the process for the evaporation of aluminium salt solution previously produced in the continuous process until a solid crystalline substance is obtained. Said evaporation process is, preferably, carried out in vacuum in one or more stages. The salt thus obtained is then decomposed by heating whereby the acid is recovered and $Al_2O_3$ is formed. When hydrochloric acid is used as dissolving agent for the raw material a complete decomposing of the aluminium chloride produced is obtained at a temperature of about 345° C. according to the formula $$2(AlCl_3 \cdot 6H_2O) = Al_2O_3 + 6HCl + 9H_2O$$

The aluminium oxide is then purified from iron, etc., for instance by a reducing heating of the substance and subsequent washing with an acid which does not dissolve the aluminium oxide. It is also possible to remove the iron already from the acid solution by precipitation or the iron can be removed from the solid aluminium chloride by extraction by means of ether, acetone or similar solvents for iron chloride. The alkali chlorides and alkaline earth chlorides possibly formed from the raw material which are not decomposed at the temperature used for decomposing the aluminium chloride may be removed from the product obtained by the heating process by washing with water. Another method of removing such compounds is to wash the solid chlorides by means of a concentrated solution of aluminium chloride. The other chlorides dissolved are then separated from said solution for recovering of $AlCl_3 \cdot 6H_2O$, if desired after the ferric chloride ($FeCl_3$) has been converted into the ferrous stage ($FCl_2$) in some well-known manner, by reaction with an equivalent amount of aluminium sulphate $(Al_2(SO_4)_3)$ to form sulphates which are less soluble in water than the aluminium chloride. The silicic acid possibly present in the raw material may in well-known manner be made insoluble in the acid used by a preparatory heating of the raw material to a temperature of 600 to 800° C., thus removing it before the treatment of the raw material with the acid.

The best thermo-technical effect is obtained if the decomposition of the raw material is performed by means of hydrochloric acid vapours obtained in the thermal dissociation. In such case the acid vapours are conducted directly from the dissociation process into a charge of fresh raw material suspended in water. Under suitable conditions such large quantities of steam are formed in said decomposing process from the inherent heat of the acid vapours supplied, the heat generated by the formation of the aluminium chloride, etc., and the heat evolved by the dissolving of the chlorides in water that they will be sufficient to evaporate all water—with the exception of the crystal water—from the solutions produced from the raw material used in the continual performance of the process. It is not advisable to use a stronger acid than 20%, an acid of such concentration having the highest boiling point, viz., 110° C. The amount of water for suspending the raw material is in such case calculated according to the formula:

$$Al_2O_3 + 6HCl + 6H_2O + 42H_2O = 2AlCl_3 + 51H_2O$$

In the accompanying drawing I have shown diagrammatically an apparatus for carrying out the process.

From the funnel 1 the finely pulverized calcined raw material, such as clay, is fed with a regulated speed into a rotating cylinder 2 which is provided with a screw feeder or entirely filled with Raschig rings or the like. Through the pipe 4 an amount of hydrochloric acid corresponding to the clay is introduced, said acid consisting partly of the acid gases 6HCl+6H₂O at about 110° C. escaping from the rotary furnace 3 in which the decomposing of aluminium chloride salt previously obtained takes place and being supplied in carefully regulated quantities through the funnel 5, partly of water supplied through a distributor 6. Said water consists, preferably, of the washing water obtained in washing the residues after the decomposition of the raw material and the condensing water formed by condensing the steam evolved in the vacuum apparatus 8 in evaporating chloride solution previously produced. The decomposition of the raw material in the drum 2 is facilitated by a thorough stirring and the high temperature. The drum 2 is closed at one end by the container 9 which has an outlet for the steam and which may be equipped with a wash column or a similar device (not shown in the drawing) for washing the escaping steam. The chloride solution formed and the insoluble residue are collected in a container in which the decomposition may be finished while the mass is thoroughly stirred. The insoluble residues are then allowed to settle whereupon the solution is recovered by decanting or filtering through a filter 7 and then supplied to the vacuum appliance 8 where it is evaporated to dryness by means of steam from the container 9. The vacuum appliance is shown in the drawing as a two-stage apparatus. The undissolved matter is washed, preferably by means of the condensing water obtained in condensing the steam evolved in the vacuum appliance 8. The chloride crystals may be treated in a container 13 with a suitable solvent, for instance acetone, which removes iron chloride while the aluminium chloride crystals remain undissolved. The pure aluminium chloride is then supplied to the funnel 5.

In feeding Al₂O₃ already formed out from the furnace 3 the air is prevented from entering by means of some suitable sealing device. Instead of using a rotary drum 2 for the decomposing an upright tower with a suitable inset or suitable filling bodies may be used in such manner that a mixture of finely pulverized raw material and water is introduced at the top together with hydrochloric acid vapours.

The process has been shown in the drawing as being continuously performed but it can, of course, also be carried out in batches. In the decomposition step it is advisable to keep the quantity of the raw material somewhat in excess over the acid used or else to make the solution produced somewhat basic to counteract its hydrolysis in the evaporation process. For the same purpose a small quantity of some basic substance, preferably Al₂O₃ or Al(OH)₃, may be added in performing the evaporation.

What I claim is:

1. A continuous cyclic process for the production of alumina from aluminiferous raw material which comprises initially subjecting said raw material to decomposing exothermic reaction by contacting the same with hot acid vapors and water to form an aluminium salt solution, insoluble residues, acid vapor and steam, separating the insoluble residues from said salt solution, evaporating the solution substantially to dryness by indirect contact with said acid vapor and steam which carries the heat evolved in the initial decomposing reaction, thermally decomposing the solid salt obtained in said evaporating step into aluminium oxide and hot acid and water vapors and then utilizing the latter vapors in the initial decomposition of the raw material.

2. A continuous cyclic process for the production of alumina from aluminiferous raw material which comprises initially subjecting said raw material to decomposing exothermic reaction by contacting the same with hot hydrochloric acid vapors and water to form an aluminium salt solution, insoluble residues, hydrochloric acid vapor and steam, separating the insoluble residues from said salt solution, evaporating the solution substantially to dryness by indirect contact with said hydrochloric acid vapor and steam which carries the heat evolved in the initial decomposing reaction, thermally decomposing the solid salt obtained in said evaporating step into aluminium oxide and hot hydrochloric acid and water vapors and then utilizing the latter vapors in the initial decomposition of the raw material.

3. A continuous cyclic process for the production of alumina from aluminiferous raw material which comprises initially subjecting said raw material to decomposing exothermic reaction by contacting the same with hot hydrochloric acid vapors and water to form an aluminium salt solution, insoluble residues, hydrochloric acid vapor and steam, separating the insoluble residues from said salt solution, evaporating under vacuum the solution substantially to dryness by indirect contact with said hydrochloric acid vapor and steam which carries the heat evolved in the initial decomposing reaction, thermally decomposing the solid salt obtained in said evaporating step into aluminium oxide and hot hydrochloric acid and water vapors and then utilizing the latter vapors in the initial decomposition of the raw material.

4. The process of claim 2 wherein the strength of the hydrochloric acid in the decomposition of the raw material is not over 20%.

5. The process of claim 2 wherein hydrochloric acid and water are recovered in condensing the acid vapor and steam in the evaporating step and in condensing steam evaporated from the salt solution, the resulting condensates being used in washing the insoluble, separated residues, whereby existing diluted salt solutions contained therein are dissolved, the resulting wash water being returned to react upon the raw material.

AXEL SIGURD BURMAN.